April 2, 1963     I. D. PRESS     3,083,989
REUSABLE FITTING WITH METALLIC SEALING RING
Filed April 30, 1957     2 Sheets-Sheet 1
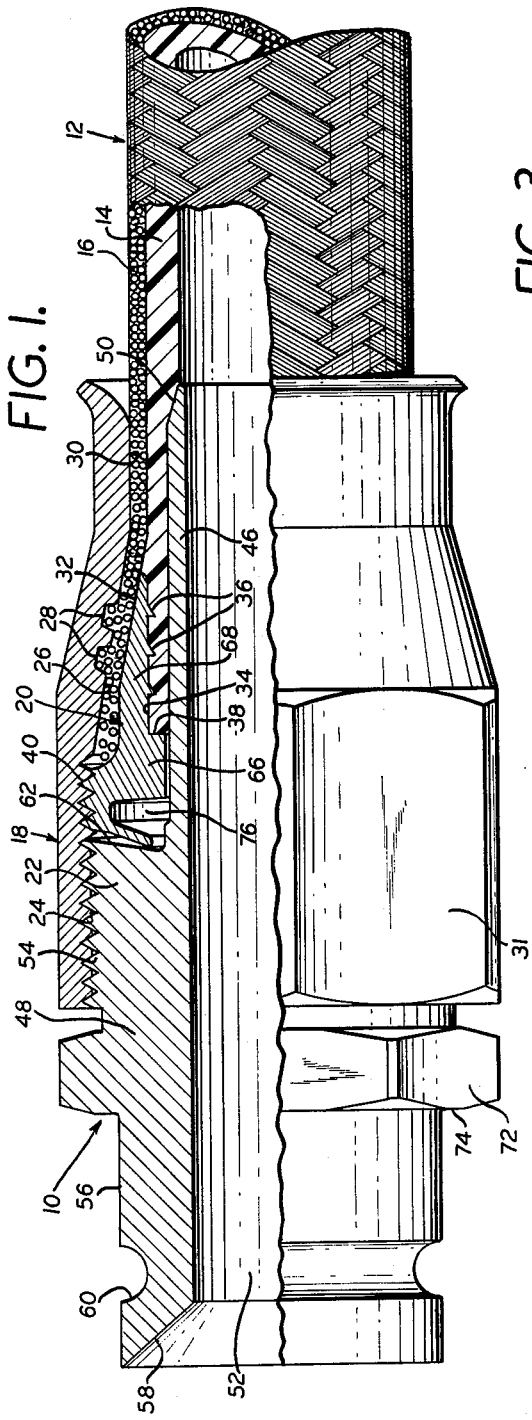
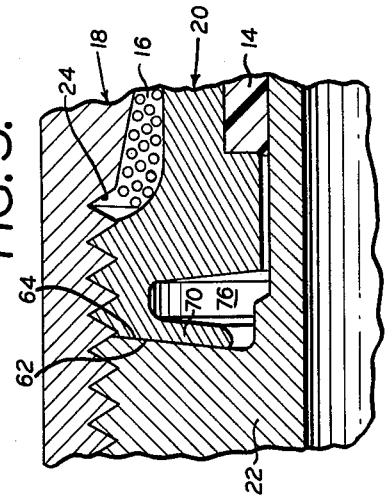
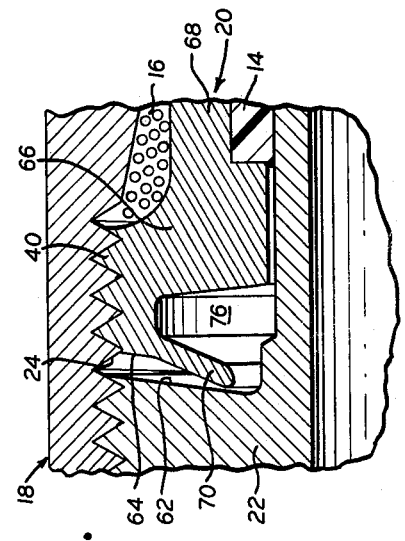
INVENTOR
IRVING D. PRESS
BY
*Churchill, Weymouth & Engel*
ATTORNEYS.

April 2, 1963     I. D. PRESS     3,083,989
REUSABLE FITTING WITH METALLIC SEALING RING
Filed April 30, 1957     2 Sheets-Sheet 2

INVENTOR
IRVING D. PRESS
BY
Churchill, Weymouth & Engel
ATTORNEYS.

United States Patent Office 3,083,989
Patented Apr. 2, 1963

3,083,989
REUSABLE FITTING WITH METALLIC
SEALING RING
Irving D. Press, West Orange, N.J., assignor to Resistoflex
Corporation, Roseland, N.J., a corporation of New
York
Filed Apr. 30, 1957, Ser. No. 656,064
1 Claim. (Cl. 285—110)

The present invention relates generally to a coupling for a tubular fluid conduit and more particularly to an end fitting for a hose having a braid covered plastic liner.

In couplings of the type employed for joining the ends of tubular fluid conduits such as hose or pipe it is frequently found necessary and desirable to form fluid-tight seals between mating metal parts and particularly between end to end abutting tubular metal members. An excellent example is the fitting described and claimed in my copending application, Serial No. 613,870, filed on October 4, 1956, now Patent No. 2,853,319, issued September 23, 1958. In that application there is described a fitting of the reusable type which is intended for use with a flexible hose having a liner formed from polytetrafluoroethylene, or other substantially inelastic tough plastic, and sheathed in a steel wire braid covering. A socket is provided for encircling the braid, a metal sleeve is provided for insertion in the end of the hose between the braid and the liner, the braid being gripped between the socket and the sleeve, and a nipple is provided having a barrel for insertion in the end of the hose inside of the liner to compress the liner against the sleeve. The nipple has a circumferentially enlarged body at the outer end of the barrel which engages the end of the sleeve. In order for this fitting to be fluid-tight, a seal must be developed between the body of the nipple and the sleeve where they engage. If the fitting of the above application is properly secured to the hose, the requisite seal is formed and the resulting assembly is normally satisfactory. However, it has been found that these fittings may not always be tightened sufficiently to form the metal-to-metal seal; or if adequately tightened they are liable to loosen even slightly in use and commence to leak.

The present invention solves the above problem in two ways. Firstly, it provides an arrangement and construction of parts whereby the metal-to-metal fluid-tight seal is maintained irrespective of substantial relative movement tending to separate the sleeve and the nipple. Secondly, it provides an anti-rotation lock or seal which restrains the parts from loosening in the first instance.

Whereas the previous fitting might develop leaks due to metal creep caused by thermal cycling, fittings constructed in accordance with the present invention have withstood prolonged baking at elevated temperatures without developing leaks.

Whereas the previous fitting had substantially zero assembling tolerance requiring the nipple to be inserted until it jammed against the sleeve, fittings constructed in accordance with the present invention will tolerate a substantial error or failure to fully insert the nipple. Conversely, if the nipple is fully inserted initially, it may be backed off in use to a substantial degree without materially affecting adversely the fluid-tight nature of the coupling.

In accordance with one specific aspect of the invention the sleeve and the nipple of the fitting are provided with mating surfaces which engage when both parts are in place, and either the sleeve or the nipple is provided further with a resilient annular portion for engaging the mating surface of the other member when the parts are assembled to form the fluid-tight or liquid-tight seal therewith, the annular portion being placed in a state of stress when the parts are in place.

Although the invention is ideally suited to the type of fitting described above it will be found useful in numerous other arrangements and in fluid couplings in general.

Therefore, in accordance with another and broader aspect of the invention an annular member is provided for use in couplings for tubular fluid conduits which is arranged to be brought into sealing engagement with an end of a tubular member, said annular member having seal forming means thereon comprising a resilient annular radially inwardly directed flange arranged for flexing in the axial direction and normally extending away from said annular member for resiliently engaging the end of said tubular member but movable towards said annular member through a snap-over position, and means for limiting the movement of said annular member relative to said tubular member to prevent said flange from being urged through said snap-over position.

The invention will be better understood along with its attendant advantages after reading the following detailed description of several illustrative embodiments thereof in conjunction with the appended drawings in which:

FIGURE 1 is a plan view partly in section of an end fitting for a hose partially assembled to illustrate the invention as applied to a sleeve and nipple;

FIGURE 2 is an enlarged fragmentary view of a portion of FIGURE 1 to clarify the construction thereof;

FIGURE 3 is an enlarged fragmentary view similar to FIGURE 2 but showing the parts of the fitting embodying the invention in completely assembled relationship;

Figure 4:
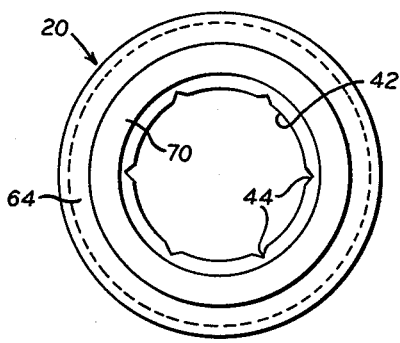
FIGURE 4 is an end view of the sleeve of FIGURE 1 showing the internal wrench engaging notches.

Referring now to FIGURES 1, 2 and 4 of the drawings, the numeral 10 designates generally an end fitting which is partially assembled to a flexible hose 12, having a tubular liner 14 of a substantially inelastic plastic such as polytetrafluoroethylene and a wire braid covering 16. The principal parts of the fitting are the socket 18, the sleeve 20, and the nipple 22.

The socket 18 is generally tubular and has a portion which encircles the braid 16. At one end the socket is internally threaded at 24, and this is followed by a tapered braid gripping surface 26. A plurality of annular grooves 28, may be provided in the surface 26 for the purpose of improving the grip on the braid. The end of the socket opposite the threaded portion 24, is cylindrical as at 30, and arranged to tightly embrace the hose. Wrench flats 31 are provided on its external surface.

The sleeve 20 is generally tubular and is externally tapered at 32 to provide a surface which is capable of mating with and which cooperates with the tapered surface 26 of the socket to grip the wire braid. Internally the sleeve has a cylindrical bore 34 sized to fit snugly on the outside of the liner 14. A plurality of internal annular ribs 36 are provided and a shoulder 38 abuts the end of the liner 14. A circumferentially enlarged portion of the sleeve is externally threaded at 40 for complementary engagement with the threads 24 of the socket. The inner surface of the sleeve behind the shoulder 38 is generally cylindrical as shown at 42 in FIGURE 4 but it is provided with indentations or notches 44 by broaching or the like for receiving a standard Allen wrench or its equivalent. Before describing the sleeve further, however, the general construction of the nipple will be mentioned.

The nipple consists generally of a tubular barrel 46 and a threaded body portion 48. The barrel 46 is externally sized to compress the liner 14 of the hose against the bore 34 of the sleeve when the barrel is inserted in the end of the liner. To facilitate insertion the leading edge of the barrel is tapered or chamfered at 50. A continuous cylindrical bore 52 passes through the entire nipple and has an internal diameter substantially equal to the normal inner diameter of the liner 14.

The threaded body portion 48 is radially enlarged with respect to the barrel and is provided with the threads 54 on its outer surface. The body portion of the nipple opposite the barrel is formed as part of a connector 56 and provided with a standard 37° seat 58 and a locking wire groove 60 which is intended to cooperate with a mating grove in a swivel nut, not shown, to provide an annular space into which a locking wire can be driven in a well known manner.

As described so far, the fitting and its parts are substantially as disclosed in the aforementioned Patent No. 2,853,319. However, unlike the fitting in said application, the instant fitting, at least insofar as the nipple and sleeve are concerned, has several material differences. These will now be discussed in detail.

Considering again the body portion 48 of the nipple it is provided with a generally radially extending face 62 inclined radially outwardly toward the barrel. This face 62 in the illustrative embodiment is frusto-conical in nature and provides a first abutting or mating surface. In a preferred embodiment the face 62 is inclined approximately 8½° from the normal to the nipple axis. The reason for this inclined surface will be explained hereinafter.

Arranged to abut or mate with the face 62 of the nipple is a frusto-conical bearing surface or seat 64 formed on the sleeve 20 on the side of the annular body 66 opposite the integral barrel 68. The inclination of seat 64 is preferably the same as face 62 on the nipple but may differ therefrom in a manner yet to be described. Formed integral with the sleeve 20 is a resilient reentrant annular portion or flange 70 shown joined to the body 66 at the inner margin of the bearing surface 64. Preferably the flange is frusto-conical in shape and when unstressed makes a more acute angle with the sleeve axis than the bearing surface 64, both being inclined, however, in the same direction with their inner margins extending axially away from the body 66. As with the nipple, in one preferred embodiment the surface 64 is inclined at an angle of approximately 8½° and the flange 70 is inclined at an angle of approximately 15°, both measured from the normal to the sleeve axis. Alternatively the surfaces 64 and 70 may be said to be inclined 81½° and 75°, respectively, with respect to the axis itself.

In assembling the fitting to the hose the socket 18 is first slipped onto the hose over the braid 16 and pushed back a short distance to expose the end of the hose. The barrel of the sleeve 20 is inserted in the end of the hose between the liner and the braid until the end of the liner 14 abuts the shoulder 38. The socket is then advanced towards the sleeve until the threads 24 and 40 engage whereupon the sleeve may be advanced by means of the Allen wrench into the socket while the latter is gripped externally in a vise or other means with the aid of the flats 31. The sleeve is advanced until the tapered mating surfaces 26 and 32 approach each other and firmly grip the braid 16. The grooves 28 facilitate this gripping action while minimizing the danger of breaking the strands of the braid.

With the hose securely anchored to the socket by the embrace of the braid between it and the sleeve, the nipple can be readily and conveniently inserted. To facilitate threading the nipple is provided with wrench flats 72 on a radial enlargement 74. With the socket, and in turn the hose, restrained against rotation, the nipple is threaded into the socket and advanced until the face or mating surface 62 encounters the inner edge of the resilient flange 70. At this point the parts will be generally as shown in FIGURES 1 and 2. Upon advancing the nipple further, however, the flange 70 on the sleeve will yield until the surface 62 encounters the seat 64 as shown in FIGURE 3. At this point the person assembling the fitting will feel a positive stop informing him that he has fully inserted the nipple. Finally by applying a little more torque to the nipple it can be jammed against the sleeve to create a "lock-nut" effect. It will be observed that the mating surfaces 62 and 64 engage over a broad area and thus are ideally suited to this purpose.

It will also be observed that the flange 70 still makes an angle of approximately 8½° to the normal to the fitting axis. That is, it lies parallel to the inclined face 62 of the nipple making broad surface contact therewith. It will be appreciated that upon further deflection of the flange 70 toward the normal a point would be reached where it would snap over and turn inside out so to speak. If this were permitted to occur, the flange would no longer bear against the face 62 of the nipple and the advantages of the invention would disappear. Additionally it has been found experimentally that the resilient portion shears off in the process of snapping through. It is, therefore, important to provide some means for limiting the relative movement of the nipple with respect to the sleeve so that the resilient flange never reaches the snap-over position. In the illustrated embodiment the means takes the form of the abutting or mating surfaces 62 and 64. The inclination thereof, beside being convenient for this purpose, also helps to center the parts relative to each other.

To understand the sealing action obtained by the above construction consider the passage of the fluid under pressure between the barrel of the nipple and the inside of the hose into the cavity 76 behind the flange 70. By its very nature a build up of pressure in this cavity tends to press the flange against the face 62 of the nipple rather than away from it. As previously mentioned heat cycling of the fitting can not destroy the seal. The flange 70 merely accommodates itself to any creep that might occur.

Figure 5:
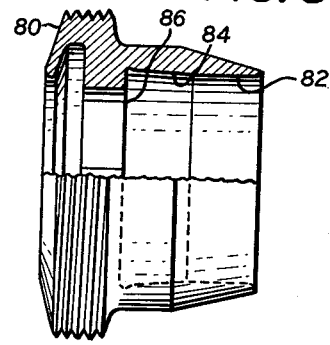
FIGURE 5 is a plan view partly in section illustrating a modification of the invention as applied to a fitting sleeve.

Referring now to FIGURE 5, there is illustrated therein a modification of the sleeve of FIGURES 1 to 4. Instead of inclining the abutting surface of the sleeve at the same angle as the mating surface on the nipple, the area 80 is inclined at the same angle as the unstressed flange. Although this construction may be somewhat easier to fabricate it has the decided disadvantage that the locking action between the sleeve and nipple must be developed over a line contact rather than over an area engagement.

The inside of the barrel of the sleeve in FIGURE 5 is also somewhat different from the sleeve described with reference to the other figures in that the ribs 36 have been omitted. Instead the outer portion 82 is formed cylindrical but of slightly less diameter than the diameter of the bore 34 in the FIGURE 1 embodiment so as to apply greater external pressure to the liner 14. At the same time the region 84 is provided with a reverse taper becoming larger as the shoulder 86 is approached. This is for the purpose of creating a zone of localized pressure in the tapered region which operates to provide a lip-sealing action. This, however, is unrelated to the metal-to-metal seal except for the fact that the latter seal is of no moment unless a satisfactory lip-seal is obtained.

Figure 6:
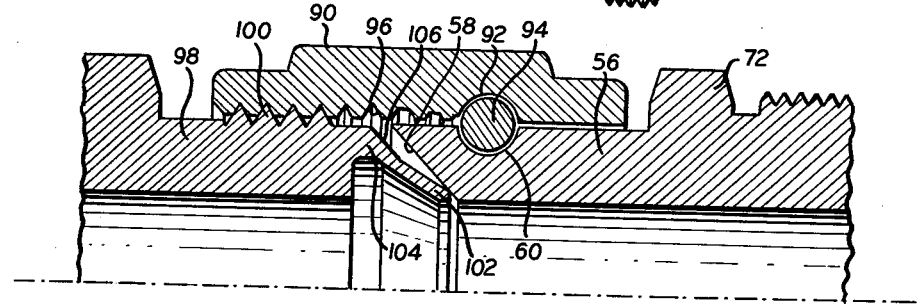
FIGURE 6 is a fragmentary longitudinal sectional view of a male and female connector in partly assembled relationship illustrating a further embodiment of the invention, the female connector being of the type shown to the left of FIGURE 1.

Referring now to FIGURE 6 of the drawing, the invention is shown as applied to a connector or coupling of the type such as might be used in making connection to the connector portion 56 of the nipple in FIGURE 1. Parts in FIGURE 6 which would correspond to the parts in FIGURE 1 are designated by the same reference numerals. Thus, there is secured to the end 56 of the nipple a swivel nut 90 having a locking groove 92 which cooperates with the groove 60 in the nipple to receive a locking wire 94. The nut is provided with internal threads 96. This provides a female connector of known construction.

Unlike the conventional male connector which has a rigid conical seat, the present invention provides a male element 98 which is threaded at 100 for mating engagement with the threads 96 of the swivel nut and is provided with a resilient annular reentrant portion 102 joined to the abutment 104 for cooperating with the seat 58 on the nipple in a manner similar to that described above with reference to the seal 62, 64, 70 in FIGURES 1 to 4. By way of example, the mating or abutting surface 106 on the male connector may be inclined at an angle of 37° to match the inclination of the seat 58. At the same time the portion 102 may be provided at an angle of 45°. By using the invention in effecting connection to the fitting 10 of FIGURE 1, the over-all performance of the entire coupling will be maintained on an equal footing. As mentioned previously, the resilient seal formed in accordance with the present invention resists destruction by thermal cycling which has been found to be the cause of frequent failure in current rigid type connectors.

Figure 7:
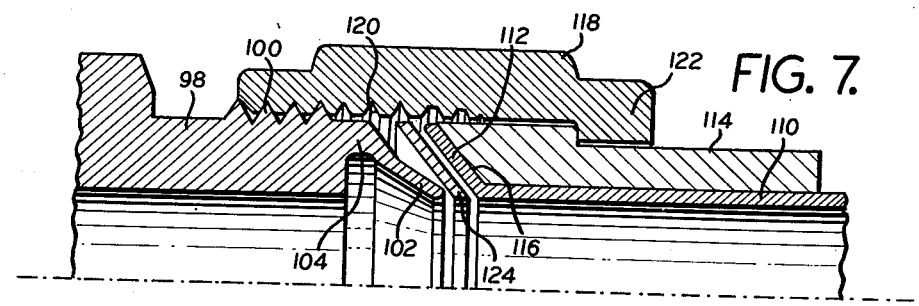
FIGURE 7 is a fragmentary longitudinal sectional view of a flared tube connector partly assembled and illustrating a still further embodiment of the invention.

FIGURE 7 illustrates the invention as applied to couplings or connectors for use with metal tubing 110 provided with the conventional flared mouth 112. As with the connectors now in use, the flared mouth of the tube 110 is backed up by a sleeve 114 having a frusto-conical seat 116. The swivel nut 118, internally threaded at 120 and retained on the sleeve 114 by the flange 122, is also known. However, the male connector is constructed in the same manner and may be identical to the male connector described in FIGURE 6. Therefore, the same reference numerals are appended thereto. It should be understood, however, that this element as well as all of the other elements encompassed by the invention are subject to modification.

If the metal pipe or tube 110 is formed from a rather soft and ductile metal it may be necessary to interpose between the flared mouth 112 and the resilient flange 102 a hard metal annular ring such as the element 124. The element 124 should be shaped to mate with or complement the seat 116 on the back-up sleeve 114. In installations where the material of tube 110 is of sufficient hardness to resist extrusion or deformation under the pressure of flange 102 the ring 124 may be dispensed with.

Figure 8:
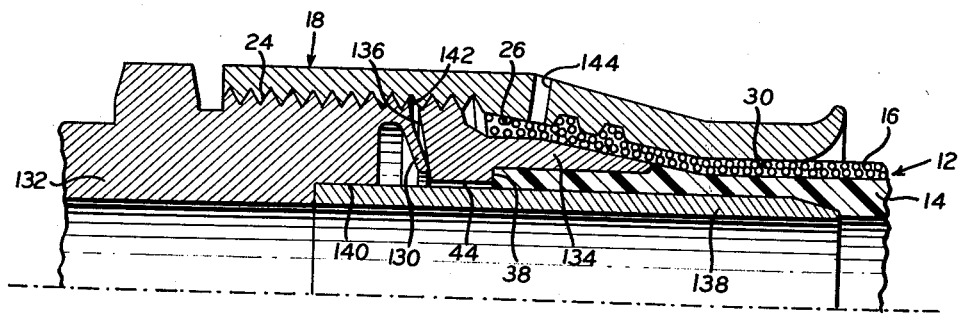
FIGURE 8 is a fragmentary longitudinal sectional view of an end fitting for a hose partially assembled to illustrate a further embodiment of the invention.

A further embodiment of the invention is shown in FIGURE 8. This represents a modification of the fitting described with reference to FIGURES 1 to 4 and therefore similar parts bear the same reference numerals. As seen in the drawing the resilient flange 130 is now formed on the body 132 of the nipple and the sleeve 134 is provided with the frusto-conical mating surface 136. To facilitate manufacture the nipple is initially formed in two parts with the cylindrical barrel 138 being inserted in the annular recess 140 of the body 132 and joined thereto by brazing or the like. The parts are assembled to a hose in the same manner as the fitting of FIGURE 1 and the nipple is inserted until the abutting surface 142 engages the surface 136. As with the FIGURE 1 embodiment, any seepage of fluid through the bore of the sleeve into the chamber formed behind the flange 130 will tend to increase the effectiveness of the seal.

With the fittings of the type shown in FIGURES 1 and 8 it is possible during assembly to inspect the position of the hose end relative to the socket prior to insertion of the nipple. That is, before the nipple is inserted it can be determined whether the hose liner is fully inserted so as to abut the shoulder 38 on the sleeve. It can then be safely concluded that the wire braid covering of the hose extends for a sufficient distance into the fitting in order to be securely gripped thereby. Once the fitting is completely assembled, however, it is impossible to determine except by X-ray whether or not the hose slipped relative to the fitting during assembly giving rise to a poor connection. This disadvantage can be completely overcome as shown in FIGURE 8 by the provision of one or more observation holes 144 in the wall of the socket at a point opposite the sleeve such that if braid is visible it may be concluded that the fitting is properly secured to the hose.

The invention has been described throughout by specific reference to the use of frusto-conical mating surfaces and resilient flange portions. These configurations have been chosen for their convenience in manufacture and their ability to form an excellent fluid-tight seal. However, it should be apparent that both the resilient portion and the limiting or abutting surfaces on the mating tubular parts may each be given a profile which is other than straight line and in other respects differs markedly from the configurations shown in the drawings by way of illustration. It should be noted, however, that the frusto-conical type of flange described above or its equivalent is capable of developing considerable stress when under strain and therefore is ideally suited to the present invention.

It is, therefore, to be understood that the foregoing detailed description is merely illustrative of the inventive concept set forth herein which is defined in the appended claim.

What I claim is:

A hard metal nipple for a braid covered hose fitting of the type having a barrel for insertion in the end of the hose and a portion for effecting a metal-to-metal seal with an independently secured fitting sleeve, comprising an annular body, a barrel extending axially from said body on one side thereof, a frusto-conical bearing surface formed on said one side of said body adjacent the outer margin thereof, and a resilient reentrant annular flange formed integral therewith and joined to said body at the inner margin of said bearing surface, said flange having a frusto-conical shape making a more acute angle with the nipple axis than said bearing surface, said flange and bearing surface both being inclined in the same direction with their inner margins extending axially away from said body, whereby said flange is adapted to be flexed into a position coinciding with the projected surface of said bearing surface and resiliently engage a fitting sleeve to form a seal therewith.

References Cited in the file of this patent

UNITED STATES PATENTS

| | | |
|---|---|---|
| 789,541 | Hayes | May 9, 1905 |
| 1,816,293 | Oberhuber | July 28, 1931 |
| 1,859,065 | Anderson | May 17, 1932 |
| 1,889,870 | Montgomery | Dec. 6, 1932 |

(Other references on following page)

UNITED STATES PATENTS

| | | |
|---|---|---|
| 2,234,350 | Muller | Mar. 11, 1941 |
| 2,239,942 | Stone | Apr. 29, 1941 |
| 2,406,488 | Brock | Aug. 27, 1946 |
| 2,428,189 | Wolfram | Sept. 30, 1947 |
| 2,452,469 | Johnson | Oct. 26, 1948 |
| 2,731,279 | Main | Jan. 17, 1956 |
| 2,746,486 | Gratzmuller | May 22, 1956 |
| 2,833,567 | Bacher | May 6, 1958 |
| 2,853,319 | Press | Sept. 23, 1958 |
| 2,900,999 | Courtot | Aug. 25, 1959 |

FOREIGN PATENTS

| | | |
|---|---|---|
| 686,387 | Great Britain | Jan. 21, 1953 |
| 151,318 | Australia | May 7, 1953 |